US007656846B2

(12) United States Patent
Metts et al.

(10) Patent No.: US 7,656,846 B2
(45) Date of Patent: Feb. 2, 2010

(54) PLC BASED WIRELESS COMMUNICATIONS

(75) Inventors: Bryan Metts, Ruckersville, VA (US); Kojakully Shetty, Charlottesville, VA (US); Yuvbir Singh, Charlottesville, VA (US); Peter G. Thomas, Huntsville, AL (US)

(73) Assignee: GE Fanuc Automation North America, Inc., Charlottesville, VA (US)

( * ) Notice: Subject to any disclaimer, the term of this patent is extended or adjusted under 35 U.S.C. 154(b) by 1058 days.

(21) Appl. No.: 10/065,778

(22) Filed: Nov. 18, 2002

(65) Prior Publication Data

US 2004/0095910 A1 May 20, 2004

(51) Int. Cl.
*H04Q 7/24* (2006.01)
(52) U.S. Cl. ...................................... 370/338
(58) Field of Classification Search ................. 370/338; 455/569, 436
See application file for complete search history.

(56) References Cited

U.S. PATENT DOCUMENTS

| | | | |
|---|---|---|---|
| 5,757,021 A | 5/1998 | Dewaele | |
| 5,774,357 A | 6/1998 | Hoffberg et al. | |
| 5,867,386 A | 2/1999 | Hoffberg et al. | |
| 5,875,108 A | 2/1999 | Hoffberg et al. | |
| 5,884,010 A | 3/1999 | Chen et al. | |
| 5,901,246 A | 5/1999 | Hoffberg et al. | |
| 5,903,454 A | 5/1999 | Hoffberg et al. | |
| 5,920,477 A | 7/1999 | Hoffberg et al. | |
| 5,986,790 A | 11/1999 | Ota et al. | |
| 6,012,161 A | 1/2000 | Ariyavisitakul et al. | |
| 6,081,750 A | 6/2000 | Hoffberg et al. | |
| 6,125,284 A | 9/2000 | Moore et al. | |
| 6,167,514 A | 12/2000 | Matsui et al. | |
| 6,216,013 B1 | 4/2001 | Moore et al. | |
| 6,226,613 B1 | 5/2001 | Turin | |
| 6,278,752 B1 | 8/2001 | Golden et al. | |
| 6,329,139 B1 | 12/2001 | Nova et al. | |
| 6,418,424 B1 | 7/2002 | Hoffberg et al. | |
| 6,434,390 B2 | 8/2002 | Rahman | |
| 6,442,217 B1 | 8/2002 | Cochran | |
| 6,459,957 B1 | 10/2002 | Bennett, III et al. | |
| 6,492,897 B1 | 12/2002 | Mowery, Jr. | |
| 6,507,676 B1 | 1/2003 | Harrington | |
| 6,519,705 B1 | 2/2003 | Leung | |
| 6,636,749 B2 * | 10/2003 | Holmes et al. ............ 455/569.2 |
| 7,058,040 B2 * | 6/2006 | Schmidt ....................... 370/337 |

* cited by examiner

*Primary Examiner*—Duc C Ho
(74) *Attorney, Agent, or Firm*—Mark A. Conklin, Esq.; Armstrong Teasdale LLP

(57) ABSTRACT

An apparatus and method for providing wireless communication for a Programmable Logic Controller (PLC). The PLC includes a central processing unit (CPU) card mounted on the backplane of the PLC, a CPU mounted on the CPU card and a means for wireless radio frequency communication coupled to the CPU so that the means for radio frequency communication and CPU communicate without using the PLC module bus.

19 Claims, 4 Drawing Sheets

PLC BASED WIRELESS COMMUNICATIONS

BACKGROUND OF INVENTION

This invention relates generally to communications between controllers and modules and, more specifically, to wireless communications within programmable logic controller (PLC) systems.

PLCs have a variety of configurations, including rack mounted Input/Output (I/O) systems. The racks provide mechanical/electrical connection slots for a power supply, central processing unit (CPU) boards, and controlled I/O modules, which provide interfaces to external devices to be controlled. In a rack system, the CPU communicates across a fixed size backplane in a main rack with local I/O modules. In many applications, more I/O modules are needed than can fit in the main control rack. Therefore, expansion racks, or multiple expansion racks, are used to hold additional I/O modules. A communication link also exists between the main rack which includes the CPU and the expansion racks to allow data transfers between all I/O modules in the application and the main rack CPU.

Other PLC systems incorporate modular configurations which allow a CPU to interconnect to a varying number of I/O modules through a common connector interface, extending the backplane communication as each I/O base is added to the previous module. This allows flexibility in installation since there is not a fixed size, as in the rack systems. The I/O modules provide different functionalities to the PLC system but all use a common communication scheme passed through the module bases. Modular systems, also, do not have to be singularly interconnected but may use a communication link between groups of interconnected modular I/O. The modular system communication link is similar to the expansion rack communication links with the main CPU controlling the flow of data to all modular I/O groups either directly through the common base connectors and through the communication cable link to an expansion grouping, or groupings, of I/O modules.

Known PLC systems incorporate many different proprietary and standard communication protocols and configurations for communications between a CPU of a PLC and I/O modules and PLC expansion racks or groups. Known industrial communications standards are still evolving, and include many different standards.

SUMMARY OF INVENTION

In one aspect, a method for manufacturing includes providing a central processing unit (CPU) configured for a Programmable Logic Controller (PLC). The PLC includes a PLC module bus for coupling at least one PLC module to the CPU. The method also includes providing a means for wireless radio frequency communications. The method also includes operationally coupling the means for wireless radio frequency communications to the CPU such that the means for wireless radio frequency communications and CPU communicate without using the PLC module bus.

In another aspect, a method for communicating includes providing a wireless communication device and sending a wireless message from the wireless communication device to a PLC having a central processing unit (CPU) and a PLC module bus for coupling at least one PLC module to the CPU. The CPU is coupled to a means for wireless radio frequency communications such that the means for wireless radio frequency communications and CPU communicate without using the PLC module bus.

In another aspect, a PLC includes a backplane, at least one module connector, a CPU card mounted on the backplane, a CPU mounted on the CPU card, and a transmitter/receiver mounted on the CPU card. The transmitter/receiver is operationally coupled to the CPU.

DETAILED DESCRIPTION

The present invention provides wireless communications embedded in a PLC for communication to other PLC products, additional PLC racks of modules, remote I/O, Human Machine Interface (HMI) systems or programming software. The connection layout may include using a wireless hub/network access point, but could also allow direct wireless communications from one wireless product to another. It is also possible to use wireless communications to connect to a server which would allow data to be transmitted to Internet based systems. The present invention includes several communication paths such as, PLC to PLC, PLC to sets of modules (remote I/O), PLC to stand alone device (personal computer or standard network), remote PLC and a I/O wireless product to a control unit, or PLC to cellular network (and to the Internet).

Figure 1:
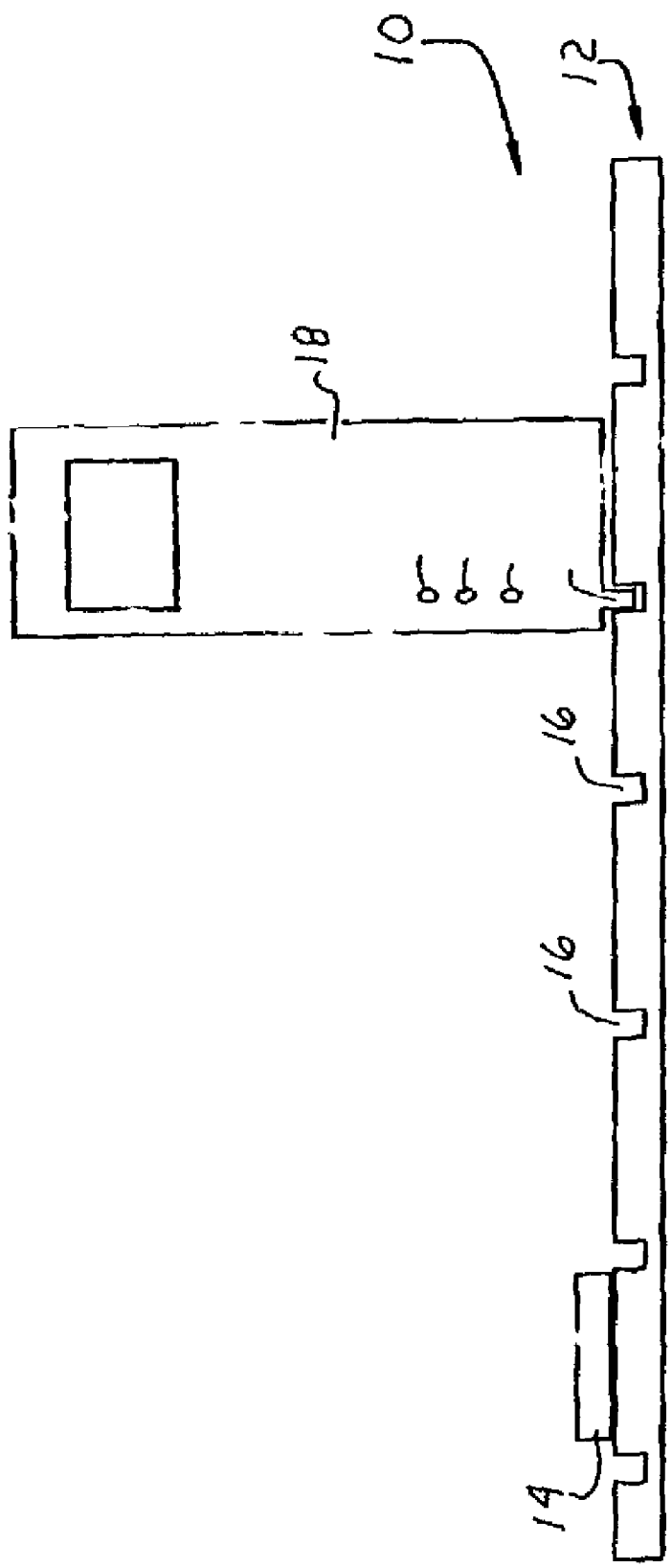
FIG. 1 is a side view of a known programmable logic controller.

FIG. 1 is a side view of a known programmable logic controller (PLC) wireless communication system 10 including a backplane 12 and a central processing unit (CPU) card 14 mounted thereon. A CPU (not shown) is mounted on the CPU card 14. Backplane 12 includes a plurality of module connectors 16 which accept modules such as a wireless communication module 18. Module connectors 16 communicate with the CPU via a PLC module bus (not shown). Typically modules other than a communication module 18 are also connected to backplane 12 via module connectors 16.

In use, the CPU sends information to be wirelessly communicated across the PLC module bus to wireless communication module 18. After receiving the information, wireless communication module 18 transmits the information to a device. Typical devices include another system like system 10, a remote rack, a computer, and a remote Input/Output (I/O). Additionally, information that is received by wireless communication module 18 is sent by wireless communication module 18 across the PLC module bus to the CPU.

Figure 2:
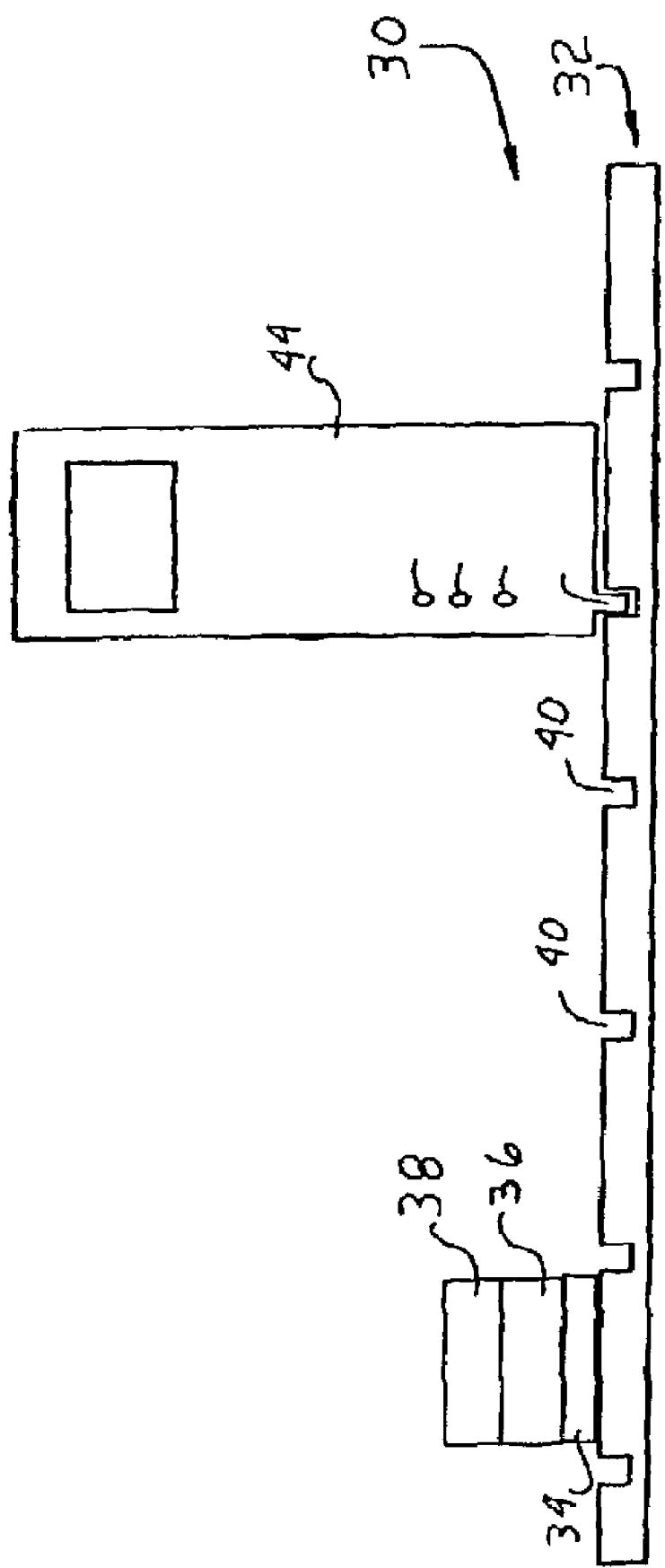
FIG. 2 is a side view of a programmable logic controller with a wireless radio frequency transmitter/receiver.

FIG. 2 is a side view of an integrated PLC wireless communication system 30 including a backplane 32 with a CPU card 34 mounted thereon. A CPU 36 and a wireless radio frequency transmitter/receiver 38 are mounted on CPU card. It is contemplated that the benefits of the invention accrue to all PLCs, and accordingly, as used herein, the term CPU refers broadly to head end unit, Network Interface Unit and other stand alone product. Backplane 32 includes a plurality of module connectors 40 which accept a PLC module 44. Module connectors 40 communicate with CPU 36 via a PLC module bus (not shown).

Wireless communication embedded in a PLC system allows for relocation of the racks and modules without having to rewire the system, thereby increasing the flexibility and maintainability of the customer. Embedding wireless communications in the head unit, either in the CPU, Network Interface Unit or a stand-alone product, reduces costs by not having to manufacture separate modules. In addition, embedding wireless communications on a remote I/O module allows customers to place the controlling module closer to the system being controlled or monitored, further reducing costs by eliminating wires that would otherwise be necessary between the I/O module and the system.

In use, information to be wirelessly radio frequency transmitted is sent from CPU 36 to transmitter/receiver 38 directly without necessarily being sent across the PLC bus. Rather, CPU 36 is integrated with transmitter/receiver 38 such that the information is communicated from CPU 36 directly to transmitter/receiver 38. This direct connection i.e., CPU 36 and transmitter/receiver 38 not having to use the PLC module bus to communicate, facilitates a faster communication rate for system 30 than for system 10 (shown in FIG. 1).

Wireless communications embedded in a PLC enables communication to other PLC products, additional PLC racks of modules, remote I/O, HMI systems or programming software. The connection layout may include using a wireless hub/network access point, but could also allow direct wireless communications from one wireless product to another. It is possible to use wireless communications to connect to a server which allows data to be transmitted to Internet based systems. In one embodiment several communication paths are provided such as, PLC to PLC, PLC to sets of modules (such as a remote I/O), PLC to a stand alone device (such as a personal computer or a known network), remote PLC and a I/O wireless product to a control unit, or PLC to cellular network (and then optionally to the Internet). One example method of accomplishing this is to integrate a Bluetooth transmitter/receiver in the main PLC rack (master PLC) and each expansion rack. The master PLC can then communicate to each slave Bluetooth device, transferring information between the devices. While this example uses Bluetooth, it may also be accomplished using wireless Ethernet (IEEE 802.11) or cellular communications.

The herein described, wireless communication embedded in a PLC removes the dependence on data cables between components and allows for quicker addition of components without creating additional wiring.

Additionally, by removing the need for a wireless communication module 18, system 30 has more available module connectors 40. In one embodiment, integrated PLC wireless communication system 30 includes at least one I/O module (not shown) and system 30 is configured as a Network Interface Unit (NIU) 30. For example, NIU 30 can be fabricated by providing an IC200GBIOO1 NIU, which is commercially available from GE FANUC North America Automation Inc. of Charlottesville Va., and which includes a VersaMax™ CPU and integrating a commercially available transmitter/receiver with the CPU. In one embodiment, transmitter/receiver 38 is a Bluetooth protocol transmitter/receiver. In another embodiment, transmitter/receiver 38 uses a wireless ethernet protocol according to the IEEE 802.11 standard. Additionally, transmitter/receiver 38 can be configurable to use a conventional cellular standard.

By embedding wireless communications capabilities in the head end unit (either the CPU or Network Interface Unit), costs are reduced by not having to manufacture a separate wireless communication module. Embedding the communications on a remote I/O or stand alone PLC and I/O product (Micro), simplifies installation by maintaining the entire product in one package.

Figure 3:
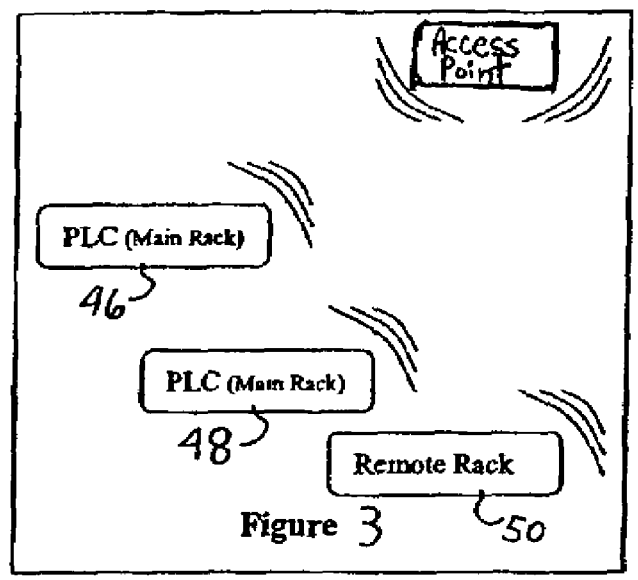
FIG. 3 is a block diagram of an embodiment of components in wireless communication with an access point.
Figure 4:
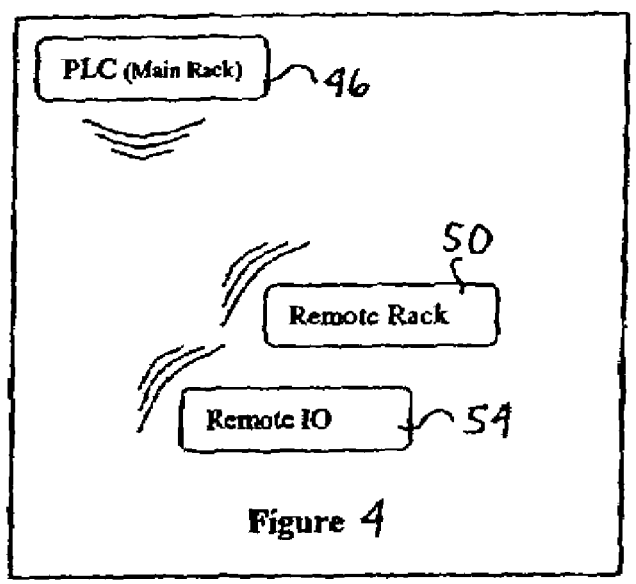
FIG. 4 is a block diagram of an embodiment of components in wireless communication with each other.

Each separate component in the PLC system has hardware capable of wireless communications. In one example, shown in FIG. 3, a 802.11 transmitter/receiver (not shown) is integrated into the PLC main racks 46, 48 and remote rack 50. Each component communicates to an access point 52 as shown in FIG. 3. Also, as shown in FIG. 4, if one of the main racks 46 can act as the access point, each component, such as the remote rack 50 and remote I/O 54, can communicate directly to the PLC main rack 46. For example, Bluetooth applications can communicate directly to the PLC main rack 46. Since data transfer occurs wirelessly, a PLC user will only need to provide a power connection.

Figure 5:
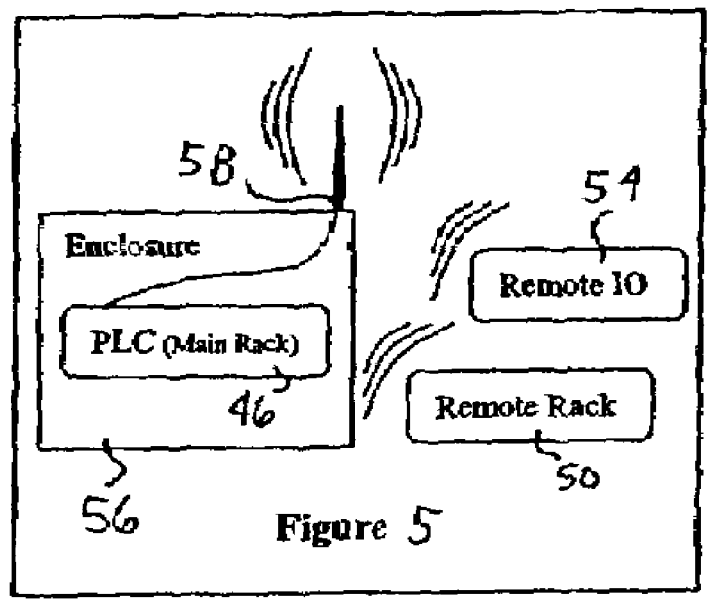
FIG. 5 is a block diagram of an embodiment of a component inside an enclosure in wireless communication with other components.

Because of the nature of wireless communications, limitations sometimes occur if either the PLC or a component is inside an enclosure 56, as shown in FIG. 5. Therefore, one embodiment provides the capability of connecting an antenna 58 to the PLC main rack 46 or other component to reach outside of the enclosure in order to contact the Remote I/O 54 and the Remote Rack 50.

Figure 6:
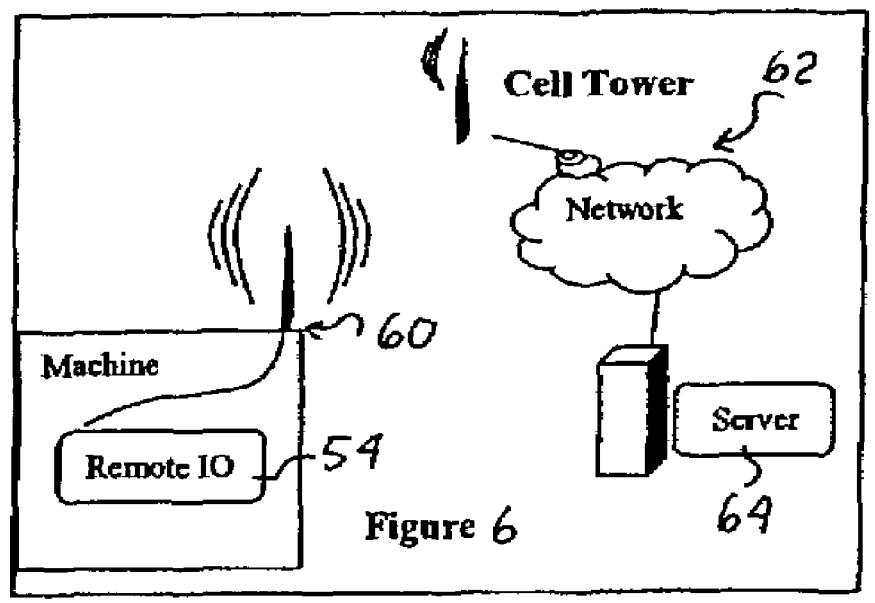
FIG. 6 is a block diagram of an embodiment of a component with a cellular communication device in wireless communication with a cellular network.

FIG. 6 shows a remote I/O 54 or PLC device containing a cellular communications device 60. The cellular communication device 60 communicates using standard cellular networks 62 to transmit data back to a central server 64. Also, a controlling device such as a personal computer or HMI can call directly into the remote device to update program files, upload or download data.

Using wireless communications between system components removes data connections, which reduces complexity. By using wireless remote I/O products, many of the wire connections between a machine and the controlling unit can be shortened, thereby saving time and money. Wireless also allows the system components to move freely within the given range of the wireless data. Any industrial control system can use wireless communications as long as there is no interference on the particular wireless frequency (or frequencies).

Central processing unit 36 is programmed to perform functions described herein, and, as used herein, the terms CPU and processor broadly refer to processors, microcontrollers, microcomputers, application specific integrated circuits, field programmable gate arrays (FPGA) and other programmable circuits.

While the invention has been described in terms of various specific embodiments, those skilled in the art will recognize that the invention can be practiced with modification within the spirit and scope of the claims.

The invention claimed is:

1. A method for manufacturing a programmable logic controller (PLC) system, said method comprising:
   providing a central processing unit (CPU) configured for a master PLC including a PLC module bus for coupling at least one PLC module to the CPU;
   providing a means for wireless radio frequency communications between the PLC and a plurality of remote slave devices; and
   operationally coupling the means for wireless radio frequency communications to the CPU by mounting the means and the CPU to a CPU card, the CPU card mounted on a backplane of a rack such that the means and the CPU communicate without using the PLC module bus.

2. A method according to claim 1 wherein providing a means for wireless radio frequency communications comprises providing a Bluetooth protocol transmitter/receiver.

3. A method according to claim 1 wherein providing a means for wireless radio frequency communications comprises providing an IEEE 802.11 protocol transmitter/receiver.

4. A method according to claim 1 wherein providing a means for wireless radio frequency communications comprises providing a cellular protocol transmitter/receiver.

5. A method according to claim 1 wherein providing a CPU configured for a PLC comprises providing a CPU configured for a PLC comprising a Network Interface Unit.

6. A method for communicating, said method comprising:
providing a plurality of wireless communication devices;
sending wireless messages from the plurality of wireless communication devices to a programmable logic controller (PLC) having a central processing unit (CPU) and a PLC module bus for coupling at least one PLC module to the CPU; and
operationally coupling a means for wireless radio frequency communications to the CPU by mounting the means and the CPU to a CPU card, wherein the CPU card is mounted on a backplane of a rack, wherein the means for wireless radio frequency communications and the CPU communicate without using the PLC module bus.

7. A method according to claim 6 wherein said sending wireless messages comprises sending wireless messages from the plurality of wireless communication devices to the PLC.

8. A Programmable Logic Controller (PLC) comprising:
a backplane comprising at least one module connector and a module bus;
a central processing unit (CPU) card mounted on said backplane;
a CPU mounted on said CPU card; and
a transmitter/receiver mounted on said CPU card, said transmitter/receiver operationally coupled to said CPU to communicate therebetween without using said module bus, wherein said PLC is configured to communicate with at least one controlled input/output module installed in a remote rack using said transmitter/receiver.

9. A PLC according to claim 8 wherein said CPU communicates with a module connected to said backplane via said at least one module connector and said module bus.

10. A PLC according to claim 8 wherein the transmitter/receiver is a Bluetooth protocol transmitter/receiver.

11. A PLC according to claim 8 wherein the transmitter/receiver is an IEEE 802.11 protocol transmitter/receiver.

12. A PLC according to claim 8 wherein the transmitter/receiver is a cellular protocol transmitter/receiver.

13. A PLC according to claim 8 wherein said PLC comprises a Network Interface Unit.

14. A programmable logic controller (PLC) system comprising:
a plurality of remote wireless devices;
an access point comprising a radio frequency receiver and a radio frequency transmitter; and
a programmable logic controller (PLC) comprising:
a central processing unit (CPU) and a PLC module bus for coupling at least one PLC module to said CPU; and
means for wireless radio frequency communications operationally coupled to said CPU, wherein said CPU is mounted on a backplane of said PLC, said means and said CPU are each configured to communicate without using said PLC module bus, and said PLC is configured to communicate with said plurality of remote wireless devices via said access point.

15. A PLC system according to claim 14 wherein said means for wireless radio frequency communications comprises a Bluetooth protocol means.

16. A PLC system according to claim 14 wherein said means for wireless radio frequency communications comprises an IEEE 802.11 means.

17. A PLC system according to claim 14 wherein means for wireless radio frequency communications comprises a cellular protocol means.

18. A PLC system according to claim 14 wherein said PLC comprises a Network Interface Unit.

19. A PLC system according to claim 14 wherein said CPU and said means for wireless radio frequency communications are mounted on a CPU card coupled to said backplane.

* * * * *